United States Patent [19]

Pargee, Jr.

[11] 4,426,698
[45] Jan. 17, 1984

[54] TELEVISION DIGITAL DATA FRAME WITH ERROR DETECTION

[75] Inventor: Robert W. Pargee, Jr., San Clemente, Calif.

[73] Assignee: Eeco Incorporated, Santa Ana, Calif.

[21] Appl. No.: 295,955

[22] Filed: Aug. 24, 1981

[51] Int. Cl.³ .......................... G06F 11/10; H04L 1/10
[52] U.S. Cl. .......................................... 371/37; 360/8; 360/37.1; 371/38
[58] Field of Search ....................... 371/37, 38, 39, 69; 360/8, 37.1, 53; 358/141

[56] References Cited

U.S. PATENT DOCUMENTS

| | | | |
|---|---|---|---|
| 3,789,137 | 1/1974 | Newell | 360/8 |
| 3,891,792 | 6/1975 | Kimura | 178/5.8 R |
| 4,093,825 | 6/1978 | Gladstone et al. | 371/69 |
| 4,159,480 | 6/1979 | Tuchi | 358/8 |
| 4,206,440 | 6/1980 | Doi et al. | 371/39 |
| 4,215,335 | 7/1980 | Doi et al. | 371/69 |
| 4,283,787 | 8/1981 | Chambers | 371/38 |
| 4,306,305 | 12/1981 | Doi et al. | 371/38 |
| 4,347,619 | 8/1982 | Dakin et al. | 375/37 |
| 4,349,904 | 9/1982 | Janssen et al. | 371/69 |

OTHER PUBLICATIONS

Kaiser and Buehlmaier, Cable Text: Text Distribution on CATV Networks, Symposium Record, 12th International Television Symposium and Technical Exhibition, Montreux, May 30, 1981, CATV Sessions vol., pp. 3–12.

Clarke and Fenn, The UK Prestel Service, Proceedings of Videotex 1981, Int. Conf. & Exhibition, May 20–22, Toronto Canada, pp. 147–167.

Roizen, Teletext in the USA, SMPTE Journal, vol. 90, No. 7, Jul. 1981, pp. 602–610.

Feldman, Digital Audio Using Your VCR, Radio Electronics, Aug. 1981, pp. 67–69.

*Primary Examiner*—Charles E. Atkinson
*Attorney, Agent, or Firm*—Harry R. Lubcke

[57] ABSTRACT

Digital data information is transmitted during at least one whole frame in television format, for the display of a television frame of alpha-numeric characters. The digital information is fitted to television lines with check bits at the end of each line. Successive fields of a frame carry the same digital information for redundant verification of accuracy. Microprocessors control processing of the information at both transmitting and receiving locations, coactively with memories. An identification code is provided for each frame.

8 Claims, 7 Drawing Figures

TELEVISION DIGITAL DATA FRAME WITH ERROR DETECTION

BACKGROUND OF THE INVENTION

This invention pertains to a visual service that electively transmits a frame of digital information over a television system.

The art has provided a number of schemes for displaying either a few lines or a page of printed text over a television system. Almost invariably these utilize one or a few horizontal scan lines within the vertical blanking interval for transmitting digital information, and by memory storage then accumulate enough information to ultimately display a full page. Certain systems utilize telephone audio channels, and have a low bit rate.

An overview of such developments is given in the paper by Joseph Roizen, "Teletext in the USA", SMPTE Journal, Vol 90, No. 7, July 1981, pgs. 602-610.

A similar study by Clarke & Fenn, "The UK Prestel Service, Technical Developments between March 1980 and March 1981", Proceedings of Videotex '81, International Conference and Exhibition, May 20-22, Toronto, Canada, Page 147, gives the status of this telephone line bandwidth system in Great Britain.

U.S. Pat. No. 3,891,792, H. Kimura, "Television Character Crawl Display Method and Apparatus", June 24, 1975, gives full details on a one line within the vertical blanking interval mode of transmission that produces one line of moving text on a regular television picture system.

Kaiser & Buehlmair, of Institut fuer Nachrichtenuebertragung, Stuttgart, W. Germany, "Cabletext, Text Distribution on CATV Networks, Symposium Record, 12th International Television Symposium and Technical Exhibition, Montreux, 30 May 1981, CATV Sessions Vol., Page 3." propose a system in which digital information is transmitted continuously on unused channel(s) of a cable TV system, by vestigial sideband radio frequency. No effort is made to utilize a video channel with synchronizing pulses.

Feldman, in "Digital Audio Using Your VCR", Radio-Electronics (magazine, USA), August 1981, forms 14 bit words for left and right stereophonic channels and alternates these along television format lines. His method does not provide reliable operation with data characters because he utilizes a relatively high bit rate and relies upon arithmetic averaging to replace missing bits.

SUMMARY OF THE INVENTION

This invention provides a service for transmitting one or more frames of digital text instead of a television picture frame.

The purpose is to provide essentially a whole frame of written text by conversion of digital information to alpha-numeric characters for display at a user (receiver) location. In this manner such information is transmitted about 200 times faster than by methods that transmit on only two lines in each vertical synchronizing interval.

Since the exposure to digital error because of lost bits is significant, a cyclical redundancy code is entered at the end of each line of digital data for the detection of error.

Rendundancy is provided by sending the same data in successive fields.

An identification code, such as the vertical interval time code (VITC), is added to each frame within the blanked synchronizing interval.

This is read at the users location and the user's choice of a frame(s) can thereby be accomplished.

The system is microprocessor controlled at the originating and the user's locations. Memories are included.

A character generator for printing text on a cathode-ray tube (CRT) screen is operated from a high density of digital bits.

DETAILED DESCRIPTION OF THE PREFERRED EMBODIMENTS

Figure 1:
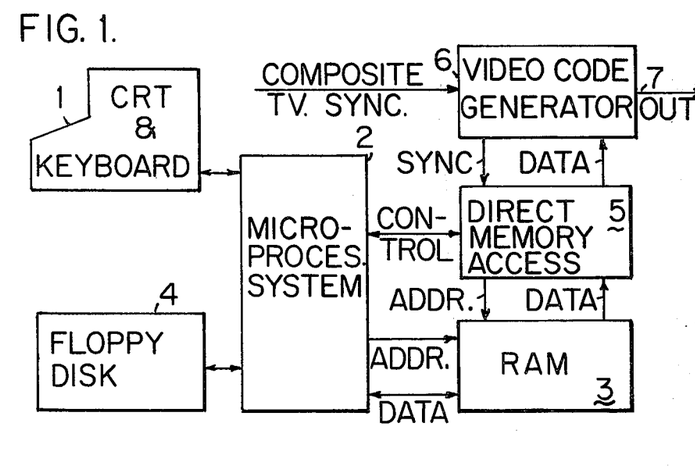
FIG. 1 is a conceptual block diagram of television data frame generating apparatus.

In FIG. 1, numeral 1 identifies a manual input station, comprised of a keyboard that gives a digital output for each key and a cathode-ray tube (CRT) that has a television raster.

The output from the keyboard passes into microprocessor system 2 and thereafter to random access memory (RAM) 3. From there one reading of the memory goes back to station 1 to actuate the CRT. This allows the user to see what has been entered via the keyboard.

Floppy (magnetic) disk 4, or the equivalent, serves to either accept what the user-operator has written and hold it, off line, for use at any other later time. Alternately, it can constitute a source of digital information that is to be processed according to this invention; the information having previously been recorded thereon by a word-processor or equivalent.

When the text in digital form has been finalized, a corresponding signal from keyboard 1 through microprocessor system 2 actuates direct memory access (DMA) 5 to rapidly read digital data from RAM 3.

These data are supplied to video code (VC) generator 6, which is also supplied with composite television synchronization. Generator 6 is activated over essentially all of each field, rather than only briefly in the vertical interval. The latter is the case with the known vertical interval time code (VITC) generator.

The output from the video code generator, at 7, is comprised of a composite television signal, having the digital data frames with appropriate horizontal and vertical synchronization and blanking. It may be transmitted over a television (wide band) transmitter or cable system, recorded on a video tape recorder, or an equivalent television signal recording device.

Figure 2:
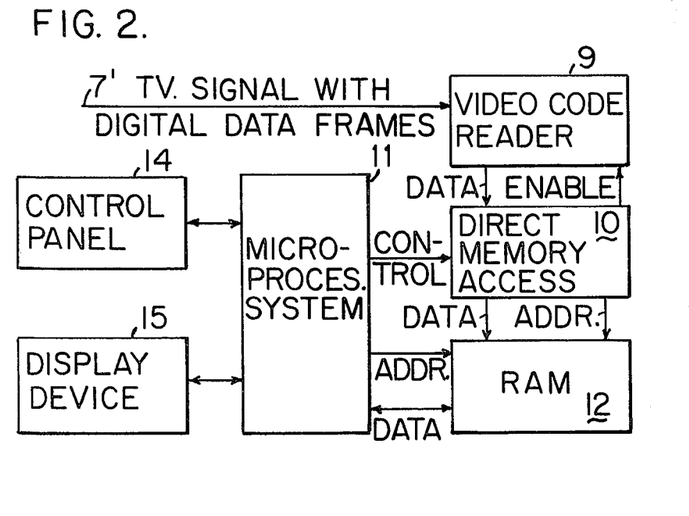
FIG. 2 is a conceptual block diagram of television data frame reading apparatus.

In FIG. 2, numeral 7' identifies the input that corresponds to output 7 of FIG. 1. As intimated above, the reception can be accomplished by a television receiver, by the receiving apparatus of a cable television system, by a reel or cassette of video tape that is physically transported from transmitter to receiver sites, or by other equivalent means.

The input enters video code (VC) reader 9, from whence video data and synchronizing information is obtained and accepted by a second DMA unit 10, upon the receipt by the reader of an enable signal from the DMA unit.

The DMA unit processes digital data rapidly, at television raster speed, to sequentially store the received digital data in RAM memory 12, beginning at an address specified by microprocessor 11. When the data have been stored, control thereof is exercised by microprocessor system 11, as to the activation and sequence of addresses to be used in RAM 12.

Control panel 14 communicates to and from microprocessor 11 and has pushbuttons to enable the user to punch in a desired selection(s). Such selection then appears on display device 15, such as a television receiver on CRT monitor, to inform the user as to what he has done.

Both DMA units 5 and 10 are specifically employed so that processing of the digital data will take place at a rapid rate, sufficient to meet the timing demands of the television raster.

Figure 3:
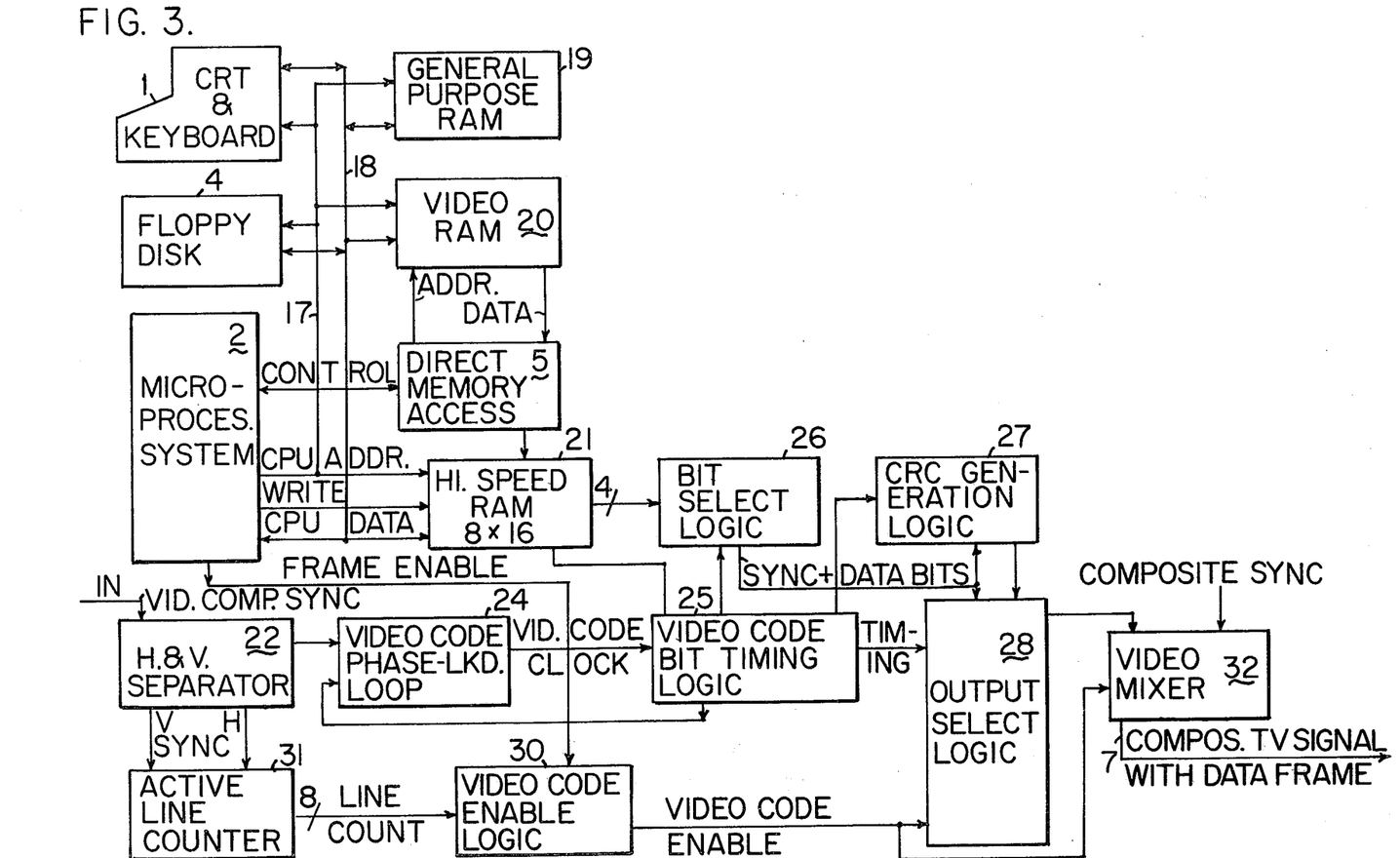
FIG. 3 is an overall video code generator block diagram.

The video code generator of FIG. 3 details element 6 and is coactively connected to the additional elements of FIG. 1.

The digital data information input in FIG. 3 is derived from either CRT keyboard 1 or floppy disk 4, as shown in FIG. 1. Therefrom, line 17 carries address information and line 18 carries the digital information.

These lines enter microprocessor 2, which may be an Intel type 8085, for control functioning of related elements. One such element is general purpose RAM 19, which may be composed of eight 2118 Intel 16K units, giving an 8×16K memory.

Also connected is video RAM 20, which may be two 2114 Intel units, giving an 8×1K memory.

RAM 20 is connected to input buses 17 and 18, and therethrough to RAM 19 and microprocessor 2.

It is further connected to DMA 5, receiving an address line therefrom and delivering a data line thereto. DMA 5 also receives a control connection from microprocessor 2. The DMA is given the starting address of the sequence that is to be unloaded from the video RAM.

Thereafter the DMA accomplishes the task at high speed, unloading each byte in less than 4.5 microseconds ($\mu$s), as required to fill the television lines at a rate of 1.79M bits per second. These data are impressed upon high speed RAM 21; which may be composed of four 74LS670, of Texas Instruments, providing an 8×16 capacity.

Aspects pertinent to line placement originate at horizontal & vertical synchronization separator 22. The input is a video composite synchronizing signal and the outputs are separated vertical and horizontal synchronizing pulses.

Video code phase-locked loop 24 accepts horizontal synchronizing pulses and generates a four times color subcarrier frequency train of clock pulses that are used for video code timing. The frequency is 14,318,180 Hz.

This clock passes into video code bit timing logic 25, which is comprised of flip-flop counters and logical AND gates that produce clocking and sequencing signals. These function to provide timing for high speed RAM 21, bit selection logic 26, CRC generation logic 27, and output select logic 28. This accomplishes compatibility between the digital bits and the synchronizing pulses defining a horizontal line.

Bit selection logic 26 accepts parallel digital information over four incoming conductors and converts this information to serial form by parallel to serial converter action. The output therefrom is via a single conductor, and is at one-half color subcarrier rate; i.e., 1,789,772.5 Hz.

An output from bit select logic 26 passes into cyclic redundancy check code (CRC) generation logic 27. This is comprised of an exclusive OR gate, an AND gate, a shift register, and additional AND gates. These are connected to effectively divide the serial output bit stream by the polynomial $(x^8+1)$ and affix the remainder as the last 8 bits in the serial code. This technique is used to provide check bits to assure the validity of the received data.

Output select logic 28 accepts the many digital data bits from logic 26, and at the end of each line of the television raster the 8 bits are inserted to implement the CRC check for that line.

Video code enable logic 30 is essentially an AND gate, which selectively enables the insertion of video code by activating the output select logic 28, and enabling video mixer 32, which identifies a television frame that is to receive video code.

Active line counter 31 is comprised of eight flip-flop counters. These count horizontal lines commencing with each field synchronizing pulse. The line count is provided to AND gates in the video code enable logic 30, in order that specific lines (e.g. lines 13 and 15 and lines 26 to 256) may be enabled.

When both the frame enable and the specific line counts are "true", the video code enable signal is produced. Video code is mixed with composite sync in video mixer 32, to produce the composite television signal 7, including the digital information frame(s).

Figure 5:
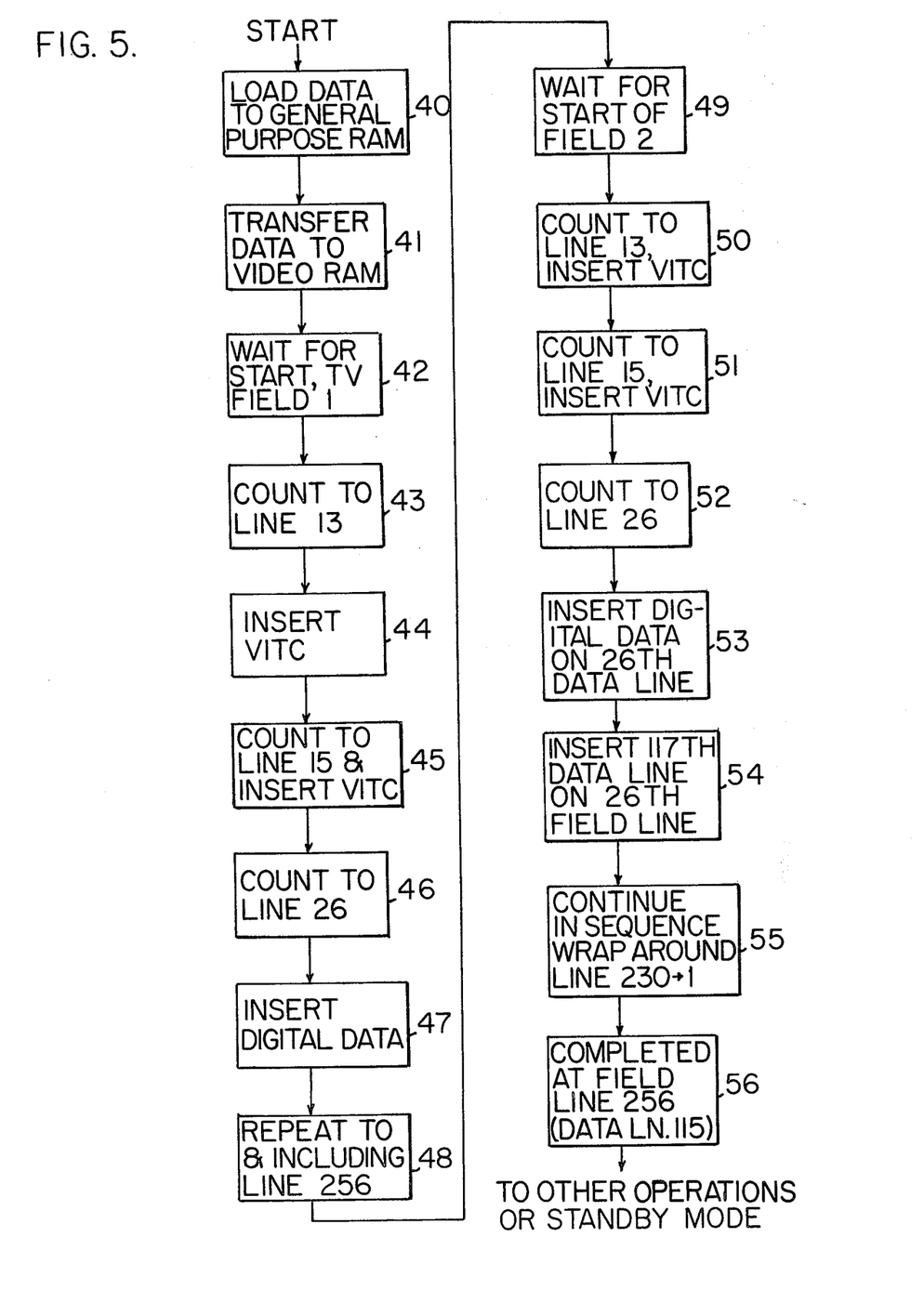
FIG. 5 is a flow chart for television data frame generating apparatus.

FIG. 5 is the flow chart for the television data frame generation apparatus of FIG. 3.

At START in FIG. 5, the first step is to "load data into general purpose RAM" (19), being activity 40. This digital information originates at CRT-keyboard 1 or floppy disk 4 of FIG. 1.

The next function, 41, is to "transfer data to video RAM". This formats the sequence and the exact content of data to subsequently be encoded into a television frame.

These and subsequent functions are commanded by microprocessor 2, which is programmed for such activity.

"Wait for start of TV frame, field 1" is the next activity.

"Count to line 13", activity 43, next occurs.

"Insert VITC", activity 44, calls for this function to be performed on line 13. This is the insertion of the vertical interval time code, by which the television frame is identified. It is used to locate that frame upon the request of a user.

Activity 45 calls for a repeat on line 15 of the "insert VITC" of line 13. This repeat provides redundancy.

Activity 46 calls for a "count to line 26".

Activity 47 calls for "insert digital data". This is the first line of data of what continues to be substantially a whole field of data.

Activity 48 calls for this insertion of data to be repeated "until & including line 256". This gives 230 lines of data.

Activity 49 calls to "wait for start of field 2".

Activities 50 and 51 repeat the previous activities of 43, 44 and 45; this time for the second field of the frame.

Similarly, activity 52 is a repeat of activity 46.

Concurrently with these several activities, beginning at activity 42, the digital data are recorded on video tape. The second field may be recorded a quadrature removed from the recording of the same data on field 1. This is to avoid tape imperfections, such as drop-outs, of the same data in both fields.

Accordingly, activity 53 requires "insert 116th data line on television line 26".

Next, activity 54 calls for "insert 117th data line on 27th field line."

Activity 55 calls for continuing the insertion of data "in sequence". After line 230 the sequence returns to data line 1.

Activity 56 calls for "completed at field line 256", which is data line 115.

Thereafter, the apparatus assumes the stand-by mode, or passes on to other operations, such as producing a second television frame of digital information, or reverting to an off-line mode in which new data is entered through keyboard 1 or by floppy disk 4.

Figure 4:
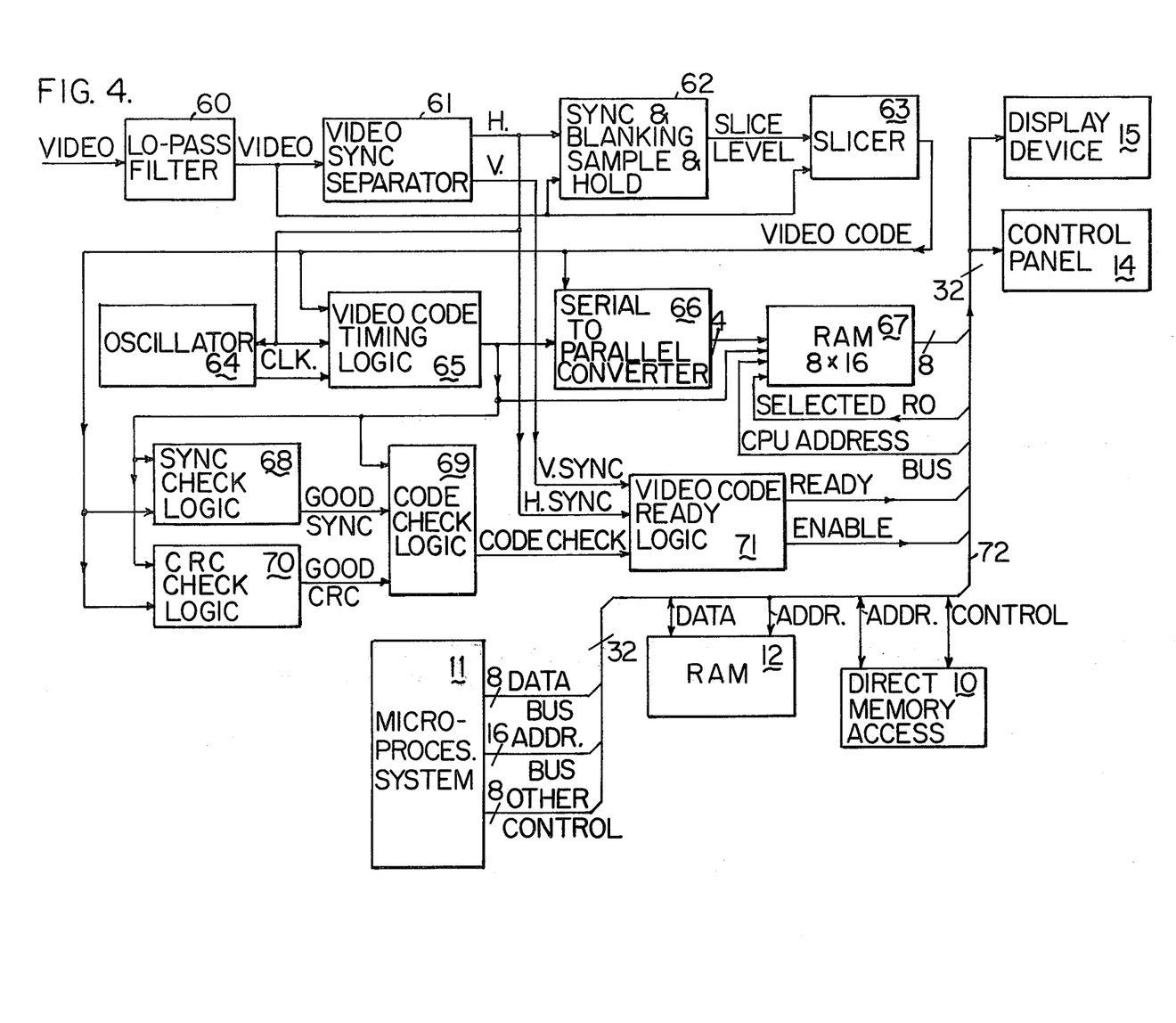
FIG. 4 is an overall video code reader block diagram.

FIG. 4 is the video code and received frame processing block diagram.

In FIG. 4 incoming composite television signals with digital data frames enter at 7', being typically the transmitted and received such signals from output 7, in FIG. 1. Such signals may also be reproduced from video storage means, such as a video tape or cassette recorder-reproducer.

The signals enter low-pass filter 60, which is for the purpose of removing high frequency spurious interference, or noise, as may have entered in the transmitter-receiver path, via radio waves or via video cable. Filter 60 may be comprised of a unity gain LM310 amplifier by National Semiconductor, followed by a pi filter circuit of one inductor and two capacitors, and followed by another unity gain amplifier.

The output from filter 60 is applied to video sync separator 61, which strips the horizontal and vertical sync from the composite signal. Separator 61 may be comprised of an input resistor-capacitor series network, a 74C04 amplifier having diode feedback, and two more 74C04 amplifiers in tandem for supplying opposite polarity of sync output.

The horizontal sync output from separator 61 is applied to sync and blanking sample and hold 62. This unit is also supplied with the full video signal. Sample and hold 62 may be comprised of a 74LS221 one-shot, which supplies width duration coincident with the horizontal synchronizing pulses. This output is supplied to an LF398 sample and hold integrated circuit (IC), available from National Semiconductor. This makes available a hold level corresponding to the amplitude of the tips of the synchronizing pulses.

Similarly, another 74LS221 one-shot is oppositely connected to the horizontal sync output from separator 61. This fires upon the positive-going trailing edge of the sync and so applies a width duration coincident with the blanking level following the horizontal sync to a second LF398 to sample and hold a level that is equal to the blanking level of the video signal.

The full video signal is also applied to both of the sample and hold ICs. This provides the voltage waveform from which the sample and hold circuits will extract the specific sync tip level and the blanking level of interest.

The two above levels are applied to slicer 63; to opposite inputs thereof of a different operational amplifier, which may be a National Semiconductor LM306H. The switching threshold thereof is a voltage that is proportional to the strength and d.c. level of the video signal. The threshold d.c. level is the "slicing level". The filtered video signal is compared with the slicing level to make a slicing decision with respect to each digital bit, as to whether it is a binary "1" or a binary "0".

By passing the output of the slicer through a 74LS04 IC inverter a $\overline{VC}$ (i.e., inverted video code) output is obtained, and by passing that through a second 74LS04 inverter a buffer video code (BVC) output is obtained.

Oscillator 64 is typically operated at four times the color subcarrier frequency of 3.579 Megahertz (MH), that is, 14.318 MH. Horizontal sync from separator 61 enters the oscillator for synchronizing purposes. The oscillator may be a CD4046 IC plus a 74S124 IC oscillator, the latter IC operating at 14.318 MH. This frequency output is fed back through a series of flip-flop frequency dividers and divided by $2 \times 455 = 910$, which gives the horizontal line frequency of 15,734 Hertz.

A comparator is provided. It compares the sync line frequency with feedback line frequency to produce a d.c. voltage proportional to phase error. Low pass d.c. circuitry following the comparator provides a control voltage to speed up or slow down the 74S124 oscillator, to lock it to the exact frequency that is four times the color subcarrier frequency. No other frequency will balance the phase-lock loop.

In FIG. 4, an output from oscillator 64, called the "video code clock" is applied to video code timing logic 65. This is the 14.318 MH frequency. A number of flip-flop frequency dividers reduce this frequency to give a number of timing signals; such as one-half (which is $2 \times$ frequency of the subcarrier), also $1 \times$ frequency of the subcarrier, $\frac{1}{2} \times$ frequency of the subcarrier, and a number of counts that determine the various bit locations in the subsequent cycles of the code.

An output of video code timing logic 65 is "video code timing", a frequency of f/2 subcarrier, goes to several subsequent blocks, one being serial to parallel converter 66. The other input to converter 66 is the video code itself; an output from slicer 63, being the buffer video code BVC.

Converter 66 is a shift register, from which outputs are taken on 4 parallel conductors.

Random access memory (RAM) 67, is connected to the 4 parallel conductors from converter 66. It has an $8 \times 16$ storage capability. The digital information is transferred 4 bits at a time into four 74LS670s that are in RAM 67. These are suited for fast loading and discharge so that fields will be filled at the rapid television scanning rate. The output is the "CPU data bus" and has 8 conductors.

The "video code timing" from logic 65 is also an input to sync check logic 68. The latter consists of various gates. Other inputs to logic 68 are $2\times$, $1\times$ and $\frac{1}{2} \times$ the frequency of the subcarrier. Two AND and an exlusive OR gates feed these inputs to a pair of LS00 gates that are cross-connected to form a latch.

If any sync bits are missing the latch is set, giving a "low" output, which indicates bad sync. Conversely, if there are no missing sync bits the latch output is "high", which indicates good sync.

The latch is reset at the start of each line by a sync actuated one-shot.

A "good sync" output from sync check logic 68 enters code check logic 69, FIG. 4. Other inputs to code check logic 69 are an output from CRC check logic 70, and a buffered BVC.

CRC check logic 70 includes an exclusive OR gate and a 74LS164 shift register fed therefrom. The output from the shift register, delayed by 8 shifts is fed back to the other input of the exclusive OR gate. This is the construction that causes the serial bit stream to be divided by $(x^8+1)$.

The result of applying this bit stream to the shift register gives a residue of "0" in this shift register at the end of all of the bits if no error has been made. If that is the circumstance, then all outputs of the shift register will be low and two AND gates, 74LS260 will both be "true".

This indicates a "good" CRC check. The logical combination of good sync and good CRC check constitutes the output of code check logic 69.

This output enters the video code ready logic 71 of FIG. 4. This is accomplished by a flip-flop LS74, which is initialized at the start of the code. When the code is completed and the check is "good", an indication is given to the data bus that the "video code is ready".

These data are now stored in 8×16 RAM 67, and are read out by direct memory access (DMA) 10, of FIG. 2. Through the address lines it is possible to address the 8×16 RAM 67, and cause output of data to the data bus of FIG. 4.

These data are stored in RAM 12, which makes the data available to microprocesso 11 when the readout process is complete.

Data from line by line continue to be read out and put into RAM 12 until all lines are read out. The microprocessor is then ready to use the data for display purposes, or to interpret the data as a control; i.e., a program or instructions. It does so to affect input-output devices (I/O) of FIG. 2. These are display 15 or control panel 14.

An example of instructions to the microprocessor would be to display a changing program in addition to a picture, or the like. This could be the time of day; i.e., seconds, minutes, hours, days, months and years. The count could carry on for 200 years. No additional peripheral devices to this already shown are required.

Display device 15 includes a Video Display Generator, such as type S68047, available from AMI, or an equivalent. This is in addition to the television scanning raster cathode-ray tube, or an equivalent.

The Video Display Generator accepts the digital information processed in this specification according to this invention and produces a dot matrix to form the desired printed letters on successive lines of the raster.

The video code reader of FIG. 4 details element 9 of FIG. 2, with the coacting additional elements of FIG. 2 also shown.

In FIGS. 2 & 4, microprocessor 11 may be an Intel 8085. The microprocessor is essentially pre-programmed, as treated throughout this specification. However, it may receive further items of program or instructions as mentioned above. "Other control" items may be function signals, such as, Read, Write, Interrupt request, and Interrupt acknowledge.

RAM 12 may be a set of eight Intel 2118 Dynamic RAM ICs. Each of these are a 1×16K unit.

Direct memory access 10 (DMA) may be an Intel 8237 DMA Controller IC.

The number of conductors in the bus showings in FIG. 4 are given in the numbers adjacent to the slash that crosses the single line shown in the figure. Thus, the address bus has 16 conductors and bus 72 has 32 conductors.

Figure 6:
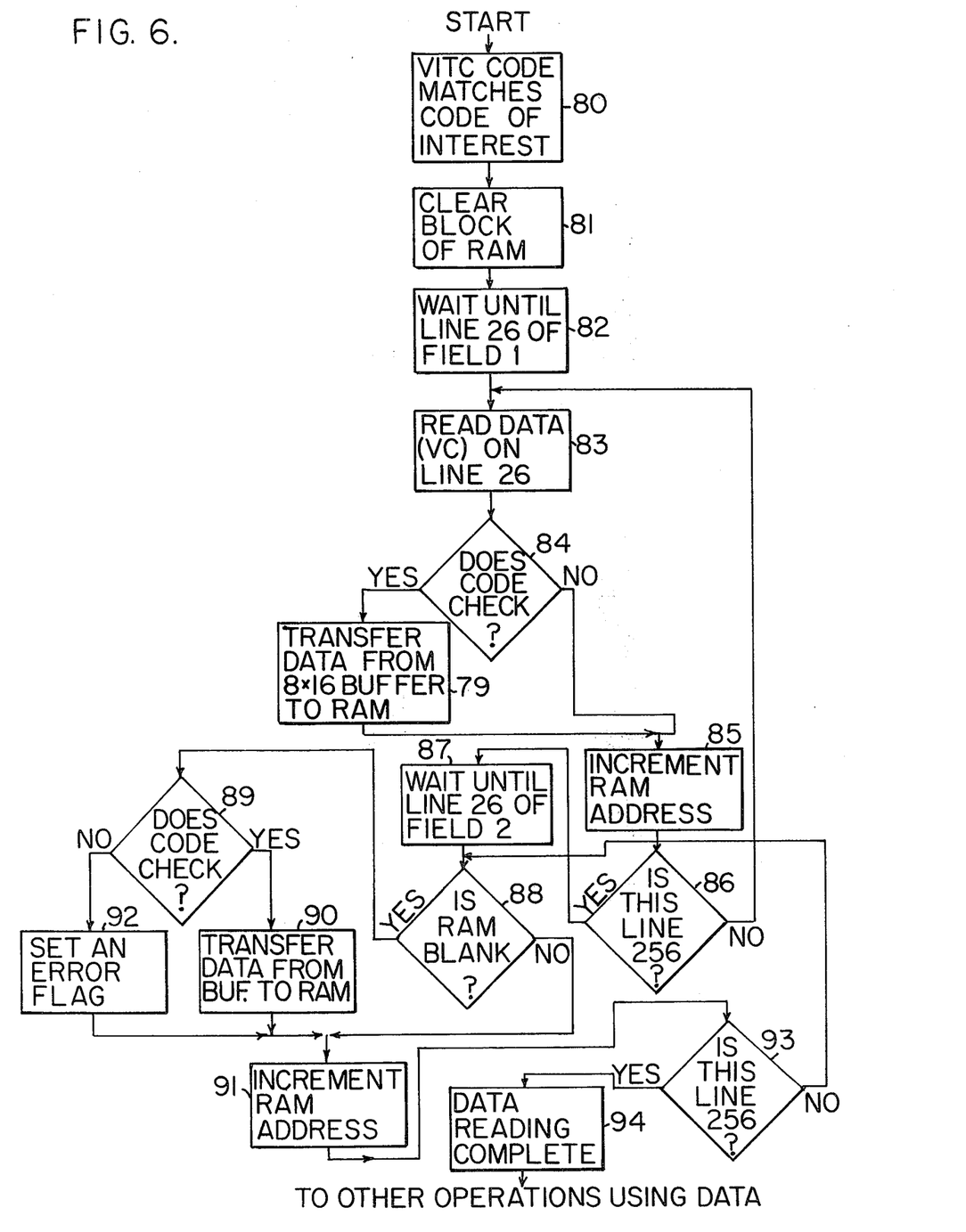
FIG. 6 is a flow chart for television data frame reading apparatus.

FIG. 6 is the flow chart for the television data frame reading apparatus of FIG. 4.

At the START, the first step, 80, is to read the several VITC codes until the one is found that "matches the code of interest". The code of interest has previously been punched-in by the user on control panel 14.

The next function, 81, is to "clear a block of RAM memory 12", if one is not already available.

The next function, 82, is to "wait until line 26 of field 1".

Function 83 calls for "reading video code (VC) data on line 26" and determining whether the code checks.

Thereafter, decision point 84 asks, "does code check?" If the answer is "No", function 85, "increment RAM address" is invoked and the processing goes on to the next location.

If the answer is "Yes", function 79, "transfer data from 8×16 buffer to RAM" takes place. This is good data because the CRC check at the end resulted in an all zero's condition. This assures no change of bits.

Thereafter, "increment RAM address", function 85, is performed.

Decision point 86 asks, "is this line 256?". Initially, the answer will be "No", and so the activity returns to function 83.

Ultimately, the answer will be "Yes". This is close to the vertical sync interval again, and so the next function, 87, is to "wait until line 26 of field 2".

Decision point 88 asks, "is RAM blank?". If the answer is "Yes", that means the CRC code did not check as valid on the first field.

This leads to another decision point, 89, which asks, "does code check?". This refers to field 2. If the answer is "Yes", the activity goes to function 90, "transfer data from (8×16) buffer into RAM". Thereafter the activity goes on to function 91, "increment RAM address".

If the answer at decision point 89 was "No", that means that the data was in error in both fields. This causes function 92 to occur, "set an error flag". This flag is stored in a special separate location in RAM 12.

If the answer at decision point 88 is "No", that means that data from field 1 had previously been accepted. This allows an immediate "increment RAM address", function 91, since there is no need to examine the data of field 2.

The final decision point 93, "is this line 256?" is next encountered. Initially, the answer will be "No", so the activity returns to point 88. There the described series of functions is repeated a sufficient number of times until the answer is "Yes".

This leads to function 94, "data reading complete", after which other operations using the data are performed, such as displaying the alpha-numeric characters on display device 15 of FIG. 2.

Figure 7:
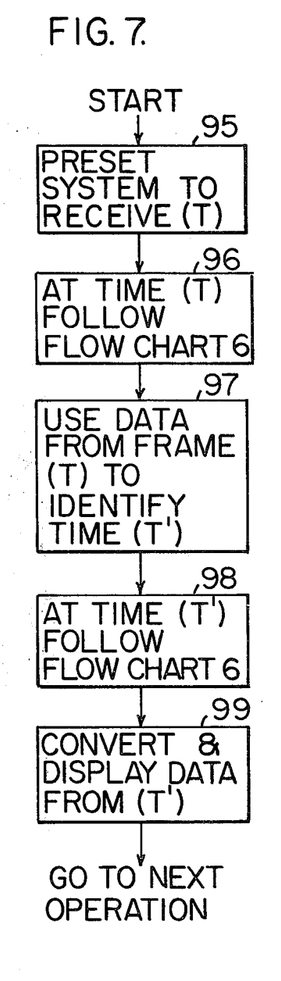
FIG. 7 is a flow chart for enhanced operation of the television data frame reading apparatus.

FIG. 7 is the flow chart for enhanced operation of the television data frame reading apparatus; namely, to give further items of program or instructions to microprocessor 11.

At the START, first step 95 is to "preset system to receive (T)". This is accomplished by the user using control panel 14 of FIG. 2, to set a time; say 8:00:00.

The next function 96, "at time (T) follow flow chart 6"; i.e., the VITC code matches the code of interest, therefore, complete all of the sequence of operations according to flow chart 6.

Thereafter, the activity returns to FIG. 7; i.e., function 97, "use of the data from frame (T) to identify time (T')".

The data at time 8:00:00 informed, for example, that the desired randomly timed data will arrive at 8:27. It is not necessary that these data be displayed; the information is inside of the memory, and so microprocessor 11 can wait for time 8:27.

Next function 98 states, "at time (T') follow flow chart 6". The VITC code matches 8:27 and so the whole of chart 6 is performed.

The final function 99 of FIG. 7 states, "convert and display data from (T')". Whatever data were received at 8:27 are now converted from digital bits to printed characters, and are displayed on display device 15.

FIG. 7 indicates the functioning of the reader apparatus for the control thereof, and as a last step to command display.

What is claimed is:

1. The method of communicating digital information that includes the method steps of;
    (a) entering into storage at sub-video speed said digital inforamtion in an amount up to and including that amount sufficient to fill the lines of a television field,
    (b) formulating a standard video signal synchronizing format,
    (c) subsequently recalling said digital information in television field sequence at video speed, save at those times occupied by said standard video signal synchronizing format,
    (d) inserting check bits at the ends of line of the digital information of said field sequence,
    (e) redundantly repeating the recalled said digital information in the next field sequence to formulate a redundant digital information module contained within a single television frame,
    (f) transmitting the field sequences,
    (g) receiving said field sequences,
    (h) recovering said digital information from said field sequences,
    (i) determining the validity of said received field sequence digital information by discerning the status of said check bits, and
    (j) storing only valid lines of digital information of received field sequences, as determined by said check bits.

2. The method of claim 1 that includes the additional method steps of;
    (a) recording transmitted said standard video signal format containing said digital information, and
    (b) reproducing the recorded information.

3. The method of claim 1 that includes the additional method steps for determining validity, of;
    (a) storing in order the digital information on each line for which a valid code check occurs in the first field of a frame, and
    (b) storing in order the digital information on each line for which a valid code check did not occur in the first field, but which does occur in the second field of a frame.

4. The method of claim 3, that includes the additional method steps for determining validity, of;
    (a) reordering the line number sequence in the second field by approximately half the number of lines in the field,
    to thereby avoid imperfections in a recording medium.

5. The method of claim 3, which additionally includes;
    (a) combining the stored valid information into a complete field sequence,
    (b) reading out said stored received field sequence, and
    (c) converting the read-out field sequence to alpha-numeric characters for display.

6. The method of claim 5, which includes the additional method steps of;
    (a) reading out the digital information of said received field sequence, and
    (b) converting the read-out digital information to microprocessor operating instructions.

7. Apparatus for communicating digital information, comprising;
    (a) a source of digital information (1),
    (b) a first microprocessor (2), having a memory (3), to control and also respond to said source of digital information, and to place the same, addressed, in said memory,
    (c) a source of standard video signal synchronizing waveform,
    (d) a video random access memory (20) to accept said digital information,
    (e) a direct memory access (5) connected to said video random access memory to accept said digital information from said video random access memory, at video speed, except at such times as pulses occur in said standard video signal synchronizing waveform,
    (f) a random access memory (21) to accept said digital information from said direct memory access at video speed and to output the same at video speed, synchronized with said standard video signal synchronizing waveform,
    (g) means (27) to insert check bits for verification, coding (26), and television synchronization (22), upon the lines in said frame,
    (h) means to transmit (7) said frame,
    (i) means to receive (7') said frame,
    (j) a vertical interval time code reader (9) for identifying the received frame of digital information,
    (k) a second microprocessor (11), having a memory, to accept the received frame of digital information,
    (l) means to form alpha-numeric characters (15) from said received frame of digital information, and
    (m) means (15) to display said received alpha-numeric characters.

8. The apparatus of claim 7, in which said digital information is synchronized with said standard video signal synchronizing waveform, for combination therewith by;
    (a) clock means (24) connected to said random access memory (21) and to said source of standard video signal synchronizing waveform
    for the alternate actuation thereof.

* * * * *